Dec. 16, 1930.    A. FRANCE    1,785,679
CLASSIFYING APPARATUS
Filed Nov. 8, 1927

Inventor:-
Antoine France
by Langner Parry Card & Langner
Attys.

Patented Dec. 16, 1930

1,785,679

UNITED STATES PATENT OFFICE

ANTOINE FRANCE, OF BRUSSELS, BELGIUM

CLASSIFYING APPARATUS

Application filed November 8, 1927, Serial No. 231,960, and in Belgium April 2, 1927.

The present invention relates to automatically regulating the operative conditions of a classifying plant with passages traversed by currents of water and comprising discharge pockets located in the bottom passage.

For this purpose the invention includes the use of two regulating members, one formed by a float indirectly subject to the variations in level of the dense material, through the action of the liquid current and the other formed by a movable bottom subject to the action of the bed of dense material located on said bottom.

According to the invention a connection is established between each of these two regulating members and the modifications which this connection undergoes are transmitted to certain factors modifying the classifying conditions and which are, for example: the feed off the entraining current, the feed of the current ascending in the discharge pockets, the cross sectional opening of said pockets, as well as the addition of a certain load of dense materials.

The accompanying drawings illustrate by way of example some embodiments of the invention.

Figure 1:
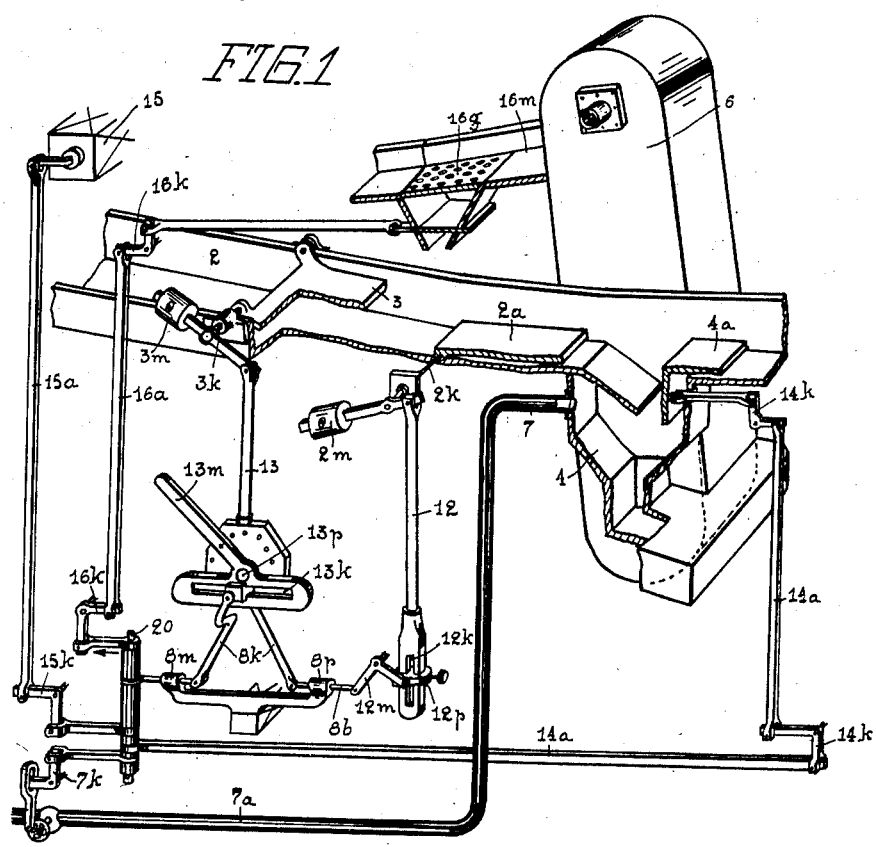
Fig. 1 is a schematic view, in perspective, of one form of my invention.

One of the regulating members is formed by a float 3 (see Fig. 1) arranged in a classifying trough 2, wherein the products treated, for example coal, pass by being entrained by a current of water. This float is formed of a board having a variable inclination and adapted to pivot about an axis $3k$ normal to the direction of the current.

This float is sensitive to variations in the level of the entraining current in the trough or passage and hence to the height of the level of the dense materials in the bottom of the trough. The second regulating member is formed by a bottom or end $2a$, over which the dense material passes to the discharge pocket 4 opening in the bottom of trough 2, this bottom $2a$ being movable about the axis $2k$ mounted normally to the direction of flow.

This second regulating member is sensitive to the variations in the weight of the layer of dense material which passes over it. The movements which the two above named regulating members 3 and $2a$ undergo may be combined so as to act separately or simultaneously to regulate the gate 15 of the entraining water current and the hopper 16 serving for the introduction of additional dense materials, these devices tending to reestablish the normal level, as well as regulating the opening of the discharge pocket 4 and a gate acting on the ascending water current introduced in said pocket, these arrangements permitting suitable separation of the dense and the heavy products.

Where the float 3 and the movable bottom $2a$ act simultaneously on the factors modifying the classifying conditions, the two above mentioned control devices are combined into a single one by means of connection established between them. The connection established between the float 3 and the movable bottom $2a$ is such, for example, that their combined action on the different above named arrangements has a determined value and direction for an increase in the quantity of dense materials.

By way of example Fig. 1 is a diagram of means to effect this connection through mechanical elements.

Slides $13k$ and $12k$ are subject respectively to the action of float 3 and movable bottom 2 through rods 13 and 12.

The above mechanical connection is formed by a toggle lever $8k$ connected at its top to the slide $13k$ and at its two other ends to the slide $12k$, on the one hand, and to a rod 20, on the other hand, by means of rods $8a$ and $8b$, said rod 20 controlling the regulation of the various devices described.

The regulable counterweights $3m$ and $2m$ are provided respectively for the float 3 and the movable bottom $2a$ so as to be able to vary the opposed reactions due to said counterweights.

Where the proportion of dense materials increases the float 3 rises and the movable bottom 2a lowers, these two movements resulting in moving rod 20 toward the right. In fact, rod 12, as well as slide 12k, lower; if at this moment the toggle lever 8k is considered as indeformable the ends 8a and 8b thereof will slide to the left by reason of the arrangement of lever 12m and carry rod 20 in the same directions.

On the other hand, the rod 13 and the slide 13k rise which causes toggle lever 8k to close by reason of the fact that the ends of said toggle lever are keyed in the vertical position by the guides 8m and 8p; if at this moment we consider the end 8b as fixed, the other end 8a, as well as rod 20, will move toward the right.

Although these two movements are antagonistic or opposed, the proportions or ratios of the different lever arms forming the above described connections are such that the resultant movement of rod 20 is made toward the right.

In the same manner it is easily seen that a decrease in the proportion of dense materials causes rod 20 to move toward the left.

By this arrangement there is a well defined ratio between the action which the two regulating members 3 and 2a transmit to rod 20.

In order to modify this ratio by external intervention a lever 13m integral with slide 13k permits the latter to move about an axis 13p which modifies the inclination of this slide relative to the direction in which the ends of toggle lever 8k move.

The movement of rod 20 controls:

1. The increase or decrease of the entraining current through the lever 15k and the rod 15a acting on gate 15. These variations of the entraining current have the result of increasing or decreasing the speed at which the products pass in trough 2.

2. The closing or opening of the hopper 16, for adding the dense material, through levers 16k and the rod 16a.

In the case of the apparatus of Fig. 1 these supplementary dense materials are formed of certain kind of dense product discharged by pocket 4. For this purpose the products at the discharge of the pocket are directed on to a bucket elevator 6 which carries the materials over an inclined plane 16m, one part of which is provided with a grating 16g arranged above hopper 16.

3. The decrease or increase of the current ascending in pocket 4 supplied by pipes 7a and 7, these variations resulting in accelerating or opposing the descent or drop of the dense products in said pocket.

4. The partial opening or closing of pocket 4 through rods 14a of lever 14k and the shutter 4a.

It is to be noted that the bottom 2a is to be considered not only as a control member, as described, but is also, in itself, a member which modifies the classifying conditions of the materials treated.

In fact, if the quantity of dense material increases or decreases bottom 2a lowers or raises so as to retard or accelerate the travel of the dense materials toward the discharge pocket.

It is obvious that all the connections may be formed by replacing the slides, the rod and the various levers, shown diagrammatically by way of example, by any kind of transmission systems.

Figure 2:
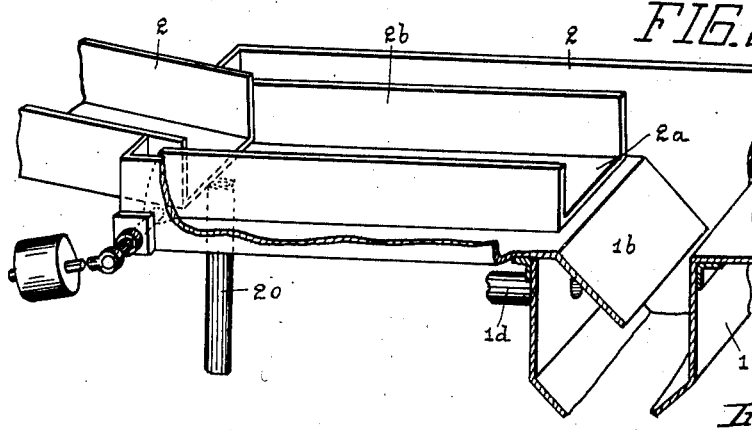
Fig. 2 is a perspective view with a part of the apparatus cut away.

As shown on Fig. 2, the bottom 2a may be formed by the bottom of a movable trough or passage 2b located at the interior of passage 2 into which the pocket 1 opens.

The passage 2b receives the solid products directly from passage 2. The entraining liquid filters or passes without inconvenience between the movable trough 2b and the outer trough 2.

In accordance with the invention a current of water may be introduced through a pipe 20 in passage 2 below the movable bottom 2a.

It is to be distinctly understood that the above installation and apparatus is only an embodiment of the invention and that various modifications are contemplated which would come within the spirit and scope of the following claims.

What I claim is:

1. In a classifying apparatus comprising a classifying channel along which elements of various density to be separated are carried by a current of liquid, means for varying the conditions of classification of said elements, said means comprising a valve controlling the carrying current, a hopper introducing a certain charge of additional dense materials, a pocket having means providing a variable aperture and passing an ascending current of liquid therethrough, and a control device acting simultaneously on the said varying means and constituted by a float disposed in the channel and influenced by the quantity of dense materials in the channel.

2. In a classifying apparatus comprising a classifying channel along which elements of various categories to be separated are carried by a current of liquid, means for varying the conditions of classification said means comprising a valve controlling the carrying current, a hopper introducing a certain charge of additional dense materials, a pocket with a variable aperture discharging heavy products and passing an ascending current of liquid therethrough, two control devices, one formed by a float disposed in the channel, the other formed by a movable plate in the bottom of the channel and pivoted at right angle with the carrying current, and means for connecting said two control devices simultaneously with each of said means for varying the conditions of classification.

3. In a classifying apparatus comprising a classifying channel along which elements of various categories to be separated are carried by a current of liquid, means for varying the conditions of classification said means comprising a valve controlling the carrying current, a hopper introducing a certain charge of additional dense materials, a pocket with a variable aperture discharging heavy products and passing an ascending current of liquid therethrough; two control devices, one formed by a float disposed in the channel, the other, formed by a movable plate in the bottom of the channel and pivoted at right angles to the carrying current, a connection between the said two control devices, and means affected by the modifications of said connection for acting simultaneously upon each of said means for varying the conditions of classification.

4. In a classifying apparatus comprising a classifying channel along which elements of various categories to be separated are carried by a current of liquid, means for varying the conditions of classification, said means comprising a valve controlling the carrying current, a hopper introducing a certain charge of additional dense materials, a pocket with a variable aperture discharging heaving products and passing an ascending current of liquid therethrough; two control devices one formed by a float disposed in the channel, the other formed by a movable plate in the bottom of the channel and pivoted at right angle with the carrying current; connection between the said two control devices, means affected by the modifications of said connection for acting upon each of the said means for varying the conditions of classification and means for changing the effect of the displacement of said connection upon the means affected by said modifications.

5. In a classifying apparatus comprising a classifying channel along which elements of various categories to be separated are carried by a current of liquid, means for varying the conditions of classification, said means being: a valve controlling the carrying current, a hopper introducing a certain charge of additional dense materials, a pocket with a variable aperture discharging heavy products and passing an ascending current of liquid therethrough; two control devices, one formed by a float disposed in the channel, the other, formed by a movable plate in the bottom of the channel and pivoted at a right angle with the carrying current; and lever systems connecting said two control devices simultaneously with each of said means for varying the conditions of classification.

6. In a classifying apparatus comprising a classifying channel along which elements of various categories to be separated are carried by a current of liquid, means for varying the conditions of classification, said means being: a valve controlling the carrying current, a hopper introducing a certain charge of additional dense materials, a pocket with a variable aperture discharging heavy products and passing an ascending current of liquid therethrough; two control devices, one formed by a float disposed in the channel, the other, formed by a movable plate in the bottom of the channel and pivoted at a right angle with the carrying current; a lever systems between said two control devices and a plurality of other lever systems connecting an element of the lever systems between the two control devices with each of the means for varying the condition of classification.

7. In a classifying apparatus comprising a classifying channel along which elements of various categories to be separated are carried by a current of liquid, means for varying the conditions of classification, said means being: a valve controlling the carrying current, a hopper introducing a certain charge of additional dense materials, a pocket with a variable aperture discharging heavy products and passing an ascending current of liquid therethrough; two control devices, one formed by a float disposed in the channel, the other, formed by a movable plate in the bottom of the channel and pivoted at a right angle with the carrying current; a lever systems between said two control devices and comprising a scissor connected to the float by a slide member, one lever of said scissor being connected to the movable plate, a plurality of other levers connecting the other lever of said scissor to each of the means for varying the condition of classification, and means of varying the inclination of said slide member so as to change the effect of the displacement of said lever systems adapted between the two control devices upon the said means affected by said displacement.

8. In a classifying apparatus, an inclined classifying channel along which are disposed: a regulable valve for the carrying current, means for introducing elements of various categories to be separated, a first control device constituted by a float, a hopper introducing a variable charge of additional dense materials, a second control device constituted by a movable plate, a pocket for discharging heavy products the aperture of which is disposed immediately after said movable plate, means for varying said aperture ascending variable current into said pocket, and an elevator for carrying a certain dense product out the pocket and introducing them into the hopper, and means for connecting said two control devices simultaneously with each of the said variable devices.

In testimony whereof I have affixed my signature.

ANTOINE FRANCE.